(12) United States Patent
Goto

(10) Patent No.: US 7,403,334 B2
(45) Date of Patent: Jul. 22, 2008

(54) OPTICAL MEMBER AND PROCESS OF PRODUCING THE SAME

(75) Inventor: Masahiro Goto, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 119 days.

(21) Appl. No.: 10/516,497

(22) PCT Filed: Mar. 5, 2004

(86) PCT No.: PCT/JP2004/002800

§ 371 (c)(1),
(2), (4) Date: Dec. 1, 2004

(87) PCT Pub. No.: WO2004/081618

PCT Pub. Date: Sep. 23, 2004

(65) Prior Publication Data

US 2005/0225871 A1    Oct. 13, 2005

(30) Foreign Application Priority Data

Mar. 7, 2003 (JP) .............................. 2003-060918

(51) Int. Cl.
G03B 21/60 (2006.01)
G03B 21/56 (2006.01)
G02B 3/08 (2006.01)
B29D 11/00 (2006.01)

(52) U.S. Cl. ...................... 359/455; 359/453; 359/456; 359/460; 359/743; 264/2.5

(58) Field of Classification Search ................. 359/443, 359/453–454, 456, 460, 742–743, 455; 264/2.5
See application file for complete search history.

(56) References Cited

U.S. PATENT DOCUMENTS

| | | | | |
|---|---|---|---|---|
| 3,718,078 A | * | 2/1973 | Plummer | ..................... 359/459 |
| 5,005,945 A | * | 4/1991 | van de Ven | ................. 359/456 |
| 5,410,006 A | * | 4/1995 | Tachibana et al. | ........ 526/292.6 |

FOREIGN PATENT DOCUMENTS

| | | |
|---|---|---|
| JP | 01-298301 | 12/1989 |
| JP | 03-220542 | 9/1991 |
| JP | 2000-035617 | 2/2000 |
| JP | 2002-040210 | 2/2002 |
| JP | 2002-169225 | 6/2002 |
| JP | 2002-267816 | 9/2002 |
| JP | 2003-043203 | 2/2003 |

* cited by examiner

Primary Examiner—Diane I. Lee
Assistant Examiner—Magda Cruz
(74) Attorney, Agent, or Firm—Oliff & Berridge, PLC

(57) ABSTRACT

The present invention provides an optical member having excellent anti-reflection properties, capable of being produced inexpensively as compared with conventional optical members having anti-reflection properties and of being mass-produced with quality kept constant. An optical member 1 has a plane of incidence 3 and a plane of emergence 5. The plane of emergence 5 has, as an optical element, prisms 2 by which the optical path of incident light (see symbol X) is changed. The plane of incidence 3 has a plurality of minute concavities 4 (see FIG. 2) by which reflection of incident light is prevented.

14 Claims, 5 Drawing Sheets

OPTICAL MEMBER AND PROCESS OF PRODUCING THE SAME

TECHNICAL FIELD

The present invention relates to an optical member that can be advantageously used in a display such as a projection screen. More particularly, the present invention relates to an optical member whose planes of incidence and emergence can effectively prevent undesirable reflection of light, and to a process of producing the optical member.

BACKGROUND ART

For example, a projection screen uses a variety of optical members, such as a Fresnel lens sheet comprising an optical element for making light projected from an imaging light source follow optical paths that are approximately parallel to one another, and a lenticular lens sheet comprising an optical element for dispersing the light that have been made parallel by the Fresnel lens sheet.

In such optical members, it is necessary to prevent, as much as possible, light (imaging light) projected from an imaging light source and light (external light) emitted from an external illuminant (e.g., a lighting fixture), from being reflected from the planes of incidence and emergence of the optical members. This is because: if the surface of an optical member reflects imaging light projected from an imaging light source, a so-called ghost image (double image) is produced; and if the surface of an optical member reflects light projected from an external illuminant, image contrast is decreased.

In order to prevent such reflection of light from the surface of an optical member, a low refractive index layer has conventionally been formed as an anti-reflection layer on a part of an optical member that is required not to reflect light, such as the plane of incidence or emergence of the optical member, thereby imparting anti-reflection properties to this part. To form such a low refractive index layer, a physical vapor deposition process (PVD process), a chemical vapor deposition process (CVD process), a resin solution application process (see Japanese Laid-Open Patent Publication No. 220542/1991, for example), or the like is used.

DISCLOSURE OF THE INVENTION

It is difficult to uniformly form a low refractive index layer on the surface of an optical member by any of the above-described conventional processes, and the low refractive index layer formed often has irregularities. Irregularities in a low refractive index layer are unfavorable to an optical member for use in a projection screen in particular. Further, the conventional processes described above are disadvantageous also from the viewpoint of cost. Furthermore, by any of the above-described conventional processes, it is difficult to conduct mass production of a low refractive index layer to obtain products that are identical in the strict sense of the word, so that it has been impossible to stably supply an optical member with quality kept constant.

The present invention has been accomplished in the light of these problems in the related art. An object of the present invention is therefore to provide an optical member having excellent anti-reflection properties, capable of being produced inexpensively as compared with conventional optical members having anti-reflection properties and of being mass-produced with quality kept constant, and a process of producing such an optical member.

The present invention provides, as a first means for fulfilling the object of the invention, an optical member having planes of incidence and emergence, comprising an optical element that changes the optical path of incident light, the optical element being formed on at least one of the planes of incidence and emergence, wherein a predetermined part of the optical member, selected from the planes of incidence and emergence, has a plurality of minute concavities by which reflection of light incident on the predetermined part is prevented.

In the optical member according to the above-described first means for fulfilling the object of the invention, it is preferable that the concavities have a mean depth of 0.05 μm or more and 0.5 μm or less and that the mean distance between neighboring two of the concavities be not more than 0.5 μm. Preferably, the concavities have a mean radius in the direction of plane 0.5 to 2 times the mean depth of the concavities.

Further, in the optical member according to the above-described first means for fulfilling the object of the invention, it is preferable that the mean depth of the concavities be 0.2 to 2 times the mean distance between neighboring two of the concavities.

Furthermore, in the optical member according to the first means for fulfilling the object of the invention, it is preferable that, of the optical member, the laminar portion including the concavities has a percentage of void of 20 to 50%.

Furthermore, in the optical member according to the first means for fulfilling the object of the invention, it is preferable that the predetermined part of the optical member, selected from the planes of incidence and emergence, has a plurality of minute protrusions in addition to the plurality of minute concavities.

The present invention provides, as a second means for fulfilling the object of the invention, an optical member having planes of incidence and emergence, comprising an optical element that changes the optical path of incident light, the optical element being formed on at least one of the planes of incidence and emergence, wherein a predetermined part of the optical member, selected from the planes of incidence and emergence, has a plurality of minute protrusions by which reflection of light incident on the predetermined part is prevented.

In the optical member according to the above-described second means for fulfilling the object of the invention, it is preferable that the protrusions has a mean height of 0.05 μm or more and 0.5 μm or less and that the mean distance between neighboring two of the protrusions be not more than 0.5 μm. Preferably, the protrusions have a mean radius in the direction of plane 0.5 to 2 times the mean height of the protrusions.

Further, in the optical member according to the above-described second means for fulfilling the object of the invention, it is preferable that the mean height of the protrusions be 0.2 to 2 times the mean distance between neighboring two of the protrusions.

Furthermore, in the optical member according to the second means for fulfilling the object of the invention, it is preferable that, of the optical member, the laminar portion including the protrusions contains the protrusions in a proportion of 20 to 50%.

Furthermore, the optical members according to the above-described first and second means for fulfilling the object of the invention are preferably for use in projection screens. This is because optical members for use in projection screens are particularly required to have anti-reflection properties. The above-described optical element is preferably one that allows incident light to follow optical paths approximately parallel to one another (e.g., a Fresnel lens), or one that allows incident light to follow dispersed optical paths (e.g., a lenticular lens).

According to the optical members of the first and second means for fulfilling the object of the invention, a predetermined part of each optical member, selected from the planes of incidence and emergence, has a plurality of minute concavities and/or protrusions, so that the refractive index of this part having the concavities and/or protrusions is the mean value of the refractive index of the base of the optical member and that of the vacant spaces in the concavities and/or that of the vacant spaces between the protrusions (i.e., the refractive index of air). For this reason, the part of the optical member, selected from the planes of incidence and emergence, having the concavities and/or protrusions, has a refractive index as low as those of conventional low refractive index layers, and the reflection of light from this part can thus be effectively prevented.

Further, according to the optical members of the first and second means for fulfilling the object of the invention, since anti-reflection properties are imparted to each optical member by providing the optical member itself with the minute concavities and/or protrusions, unlike conventional optical members having anti-reflection properties, in which anti-reflection layers such as low refractive index layers are separately formed on the optical members in order to impart thereto anti-reflection properties, all of the problems with the conventional optical members, such as the problem that an anti-reflection layer cannot be uniformly formed, the problem with adhesion between the base of an optical member and an anti-reflection layer, and the cost problem can be solved.

Furthermore, according to the optical members of the first and second means for fulfilling the object of the invention, the part of each optical member, selected from the planes of incidence and emergence, having the minute concavities and/or protrusions, shows anti-reflection properties, and the refractive index of this part can be freely controlled by the mean depth of the concavities and/or the mean height of the protrusions, the mean distance between neighboring two of the concavities and/or protrusions, or the like. Specifically, for example, by making the ratio of the mean distance between neighboring two of the concavities to the mean depth of the concavities smaller (i.e., by making the percentage of void greater), it is possible to make lower the refractive index of the part of the optical member, selected from the planes of incidence and emergence, having the minute concavities. In this regard, we have found that when the mean depth of the concavities or the mean height of the protrusions, the mean distance between neighboring two of the concavities and/or protrusions, and the ratios between these values are controlled to fall in the above-described ranges, the optical member can show more excellent anti-reflection properties.

The optical members of the first and second means for fulfilling the object of the invention can be used as Fresnel lens sheets having thereon Fresnel lenses (optical elements) or lenticular lens sheets having thereon lenticular lenses (optical elements). Therefore, by incorporating these optical members into projection screens, it is possible to effectively solve various problems with conventional projection screens (production of ghost images, decrease in image contrast, etc.).

The present invention provides, as a third means for fulfilling the object of the present invention, a process of producing an optical member, comprising: preparing a mold for molding an optical member comprising an optical element that changes the optical path of incident light, a predetermined part of the surface of the mold having a plurality of minute protrusions that correspond to a plurality of minute concavities which a predetermined part of the optical member, selected from the planes of incidence and emergence of the optical member, has; casting a molding resin upon the surface of the mold having the protrusions to cure the molding resin; and releasing the cured molding resin from the mold, thereby taking out the optical member having a plurality of minute concavities in its predetermined part.

The present invention provides, as a fourth means for fulfilling the object of the present invention, a process of producing an optical member, comprising: preparing a mold for molding an optical member comprising an optical element that changes the optical path of incident light, a predetermined part of the surface of the mold having a plurality of minute concavities that correspond to a plurality of minute protrusions which a predetermined part of the optical member, selected from the planes of incidence and emergence of the optical member, has; casting a molding resin upon the surface of the mold having the concavities and curing the molding resin; and releasing the cured molding resin from the mold, thereby taking out the optical member having a plurality of minute protrusions in its predetermined part.

According to the processes of producing optical members of the third and fourth means for fulfilling the object of the present invention, since the minute concavities and/or protrusions which a predetermined part of each optical member, selected from the planes of incidence and emergence of the optical member, has are shaped by a mold having, on its surface, minute protrusions and/or concavities that correspond to the minute concavities and/or protrusions which the predetermined part of the optical member has, the optical member can be mass-produced with quality kept constant. For this reason, the processes of the third and fourth means can attain stable supply of an optical member having excellent anti-reflection properties.

According to the processes of producing optical members of the third and fourth means for fulfilling the object of the present invention, an optical member is molded by the use of a mold having, on its surface, minute protrusions and/or concavities that correspond to minute concavities and/or protrusions which a predetermined part of the optical member, selected from the planes of incidence and emergence of the optical member, has, so that it is possible to integrally mold, with the optical member, an optical element for the optical member by using this mold. Namely, it is possible to produce an optical member having both specific optical functions and anti-reflection properties in a conventional manner by making use of a conventional mold. It is therefore possible to produce the optical member at much lower cost than the cost required for the conventional production process in which an anti-reflection layer such as a low refractive index layer is formed on an optical member in a separate step. Moreover, since there is no need to form an anti-reflection layer such as a low refractive index layer by a coating method or the like, the conventional problems, such as the problem that an anti-reflection layer cannot be uniformly formed and the quality problem, never occur. An optical member can therefore be stably supplied with quality kept constant by the process of the third or fourth means.

EMBODIMENTS FOR CARRYING OUT THE INVENTION

By referring to the accompanying drawings, embodiments of the present invention will be described hereinafter. The following embodiment will be described with reference to the case where an optical member to which the present invention is applied is a Fresnel lens sheet having prisms (optical element) that allow incident light to follow optical paths approximately parallel to one another.

Figure 1:
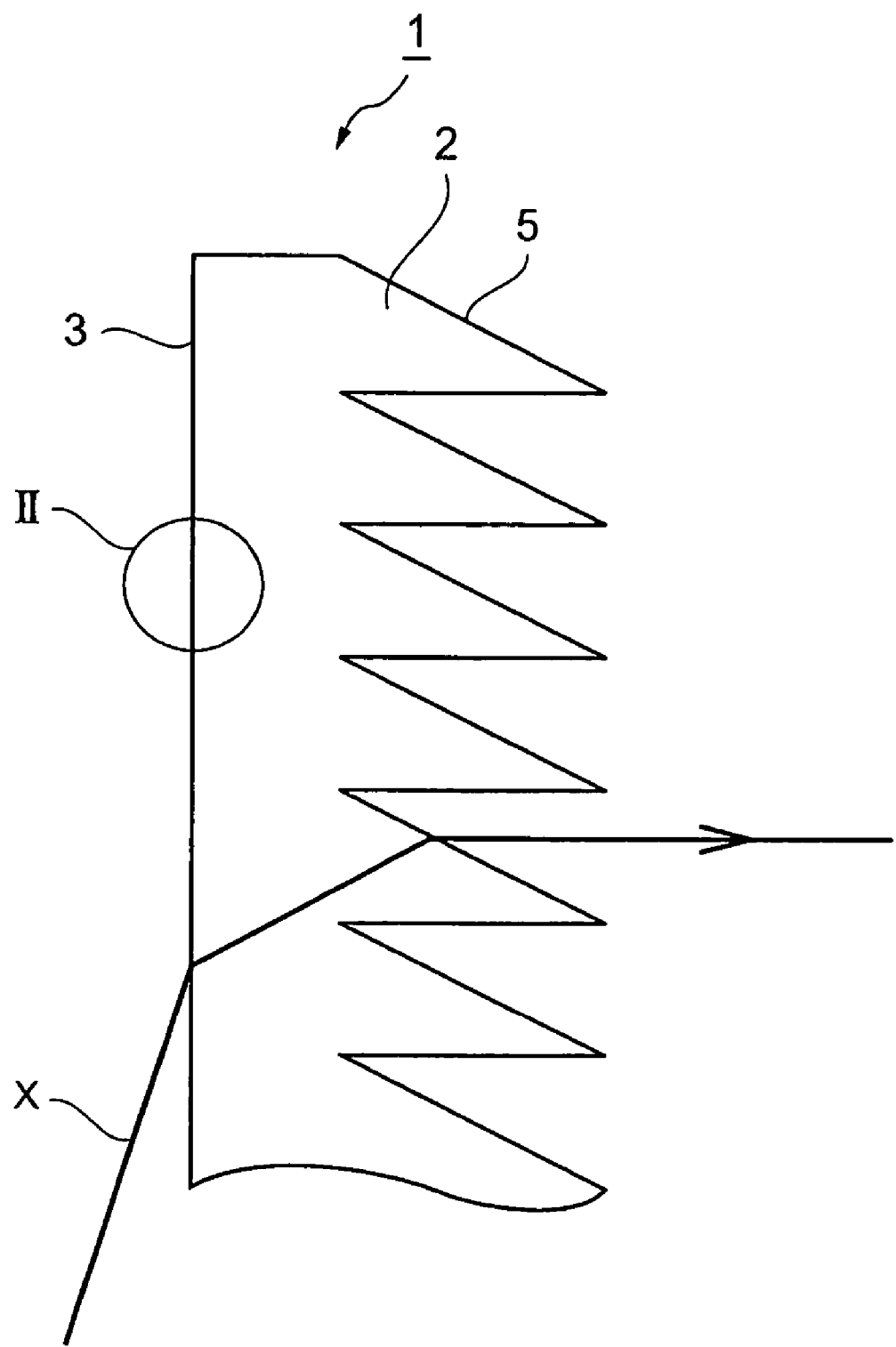
FIG. 1 is a diagrammatic sectional view of a Fresnel lens sheet serving as an optical member according to an embodiment of the present invention.
Figure 2:
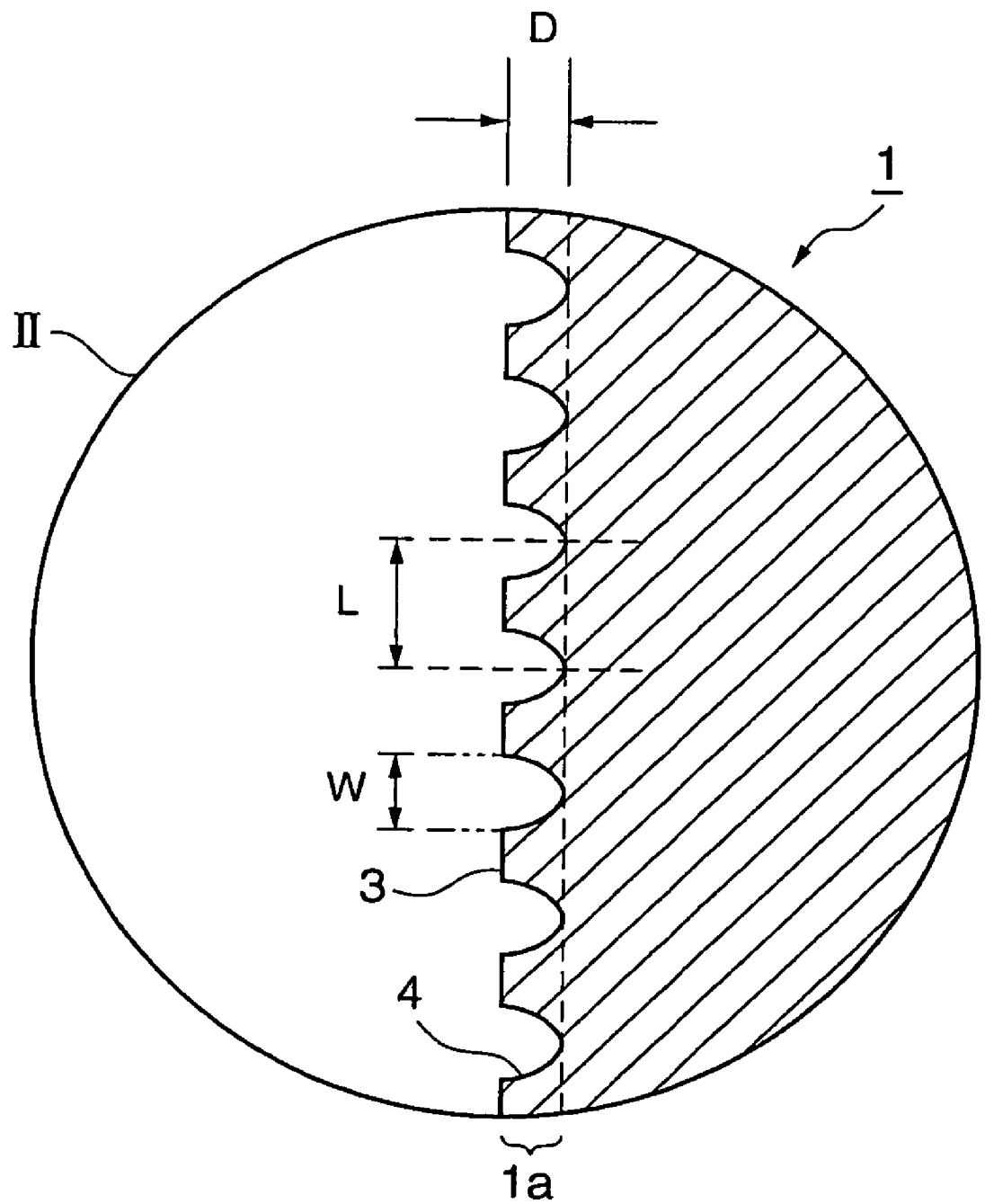
FIG. 2 is an enlarged sectional view of part II of the optical member shown in FIG. 1.

As shown in FIG. 1, an optical member 1 according to this embodiment has a plane of incidence 3 and a plane of emergence 5. The plane of emergence 5 has a plurality of prisms (optical element) 2 by which the optical path of incident light is changed (see symbol X in FIG. 1). On the other hand, as shown in FIG. 2, the plane of incidence 3 has a plurality of minute concavities 4 by which reflection of light incident on this plane is prevented. Namely, the optical member 1 according to this embodiment is that the optical member 1 itself has the minute concavities 4 that function as an anti-reflection layer, unlike a conventional optical member having anti-reflection properties, comprising an anti-reflection layer such as a low refractive index layer formed separately.

The concavities 4 in the plane of incidence 3 of the optical member 1 will be described below in detail.

As shown in FIG. 2, the plane of incidence 3 has the concavities 4 having a mean depth D, 0.5 to 2 times their radii (W/2) in the direction of plane, the mean distance between neighboring two of the concavities 4 being denoted by L.

The mean depth D of the concavities 4 greatly varies depending on the intended use of the optical member and on how much the optical member is required to show anti-reflection properties. In general, however, it is preferable that the mean depth D of the concavities 4 be 0.05 μm or more and 0.5 μm or less, more preferably 0.06 μm or more and 0.2 μm or less. The reason for this is as follows: if the mean depth D of the concavities 4 is smaller than the above-described range, there is the possibility that the part having the concavities 4 cannot fully show anti-reflection properties; while if the mean depth D of the concavities 4 is greater than the above-described range, incident light (X) is excessively affected by the concavities 4 and is scattered or diffuse-reflected, so that there is the possibility that the optical member 1 as a whole has a lowered transmittance for the light.

Further, it is possible to freely set the mean distance L between neighboring two of the concavities 4 with consideration for the intended use of the optical member 1, etc. as in the above-described case of the mean depth D of the concavities 4. In general, however, it is preferable that the mean distance L be not more than 0.5 μm, more preferably 0.08 μm or more and 0.2 μm or less. The reason for this also is the same as in the case of the mean depth D of the concavities 4. Namely, when the mean distance L between neighboring two of the concavities 4 exceeds the above-described range, there is the possibility that the part having the concavities 4 cannot fully show anti-reflection properties, while when the mean distance L between neighboring two of the concavities 4 is smaller than the above-described range, incident light (X) is excessively affected by the concavities 4 and is scattered or diffuse-reflected, so that there is the possibility that the optical member 1 as a whole has a lowered transmittance for the light.

Furthermore, the mean depth D of the concavities 4 and the mean distance L between neighboring two of the concavities 4 are preferably in such a relationship that the ratio of the mean depth D to the mean distance L (i.e., D/L) falls in the range of 0.2 to 2, more preferably in the range of 0.3 to 1. This is because: as long as the ratio of the mean depth D of the concavities 4 to the mean distance L between neighboring two of the concavities 4 falls in the above-described range, the optical member 1 can show excellent anti-reflection properties, and, moreover, there is no particular difficulty in the production of the optical member 1.

As shown in FIG. 2, of the optical member 1, the laminar portion 1a with the concavities 4 has a refractive index that is the mean value of the refractive index of the base of the optical member 1 and the refractive index of the vacant spaces in the concavities 4 (that is, the refractive index of air). Therefore, the portion 1a has a refractive index lower than that of the base and can thus show excellent anti-reflection properties. It is possible to freely control the percentage of void of the laminar portion 1a with the concavities 4 by the mean depth D, the mean distance L, etc., and by controlling this percentage of void, it is possible to freely give varied refractive indices to the plane of incidence 3 of the optical member 1. It is herein preferable that, of the optical member 1, the laminar portion 1a with the concavities 4 has a percentage of void of 20 to 50%.

In the above embodiment, the plane of incidence 3 of the optical member 1 has the minute concavities 4. However, the part that has the minute concavities 4 is not limited to the plane of incidence 3, and any part of the optical member 1 that is required to show anti-reflection properties can have the minute concavities 4. Specifically, for example, not only the surface of the plane of incidence 3 can entirely or partly have the minute concavities 4, but also the surface of the prisms 2 on the plane of emergence 5 or both of the plane of incidence 3 and the plane of emergence 5 can have the minute concavities 4.

Next, a process of producing the optical member 1 shown in FIGS. 1 and 2 will be described with reference to FIGS. 3(a) to 3(d). FIGS. 3(a) to 3(d) show a process of forming the concavities 4 in the surface of the prisms 2 on the plane of emergence 5 of the optical member 1 shown in FIG. 1.

Figure 3:
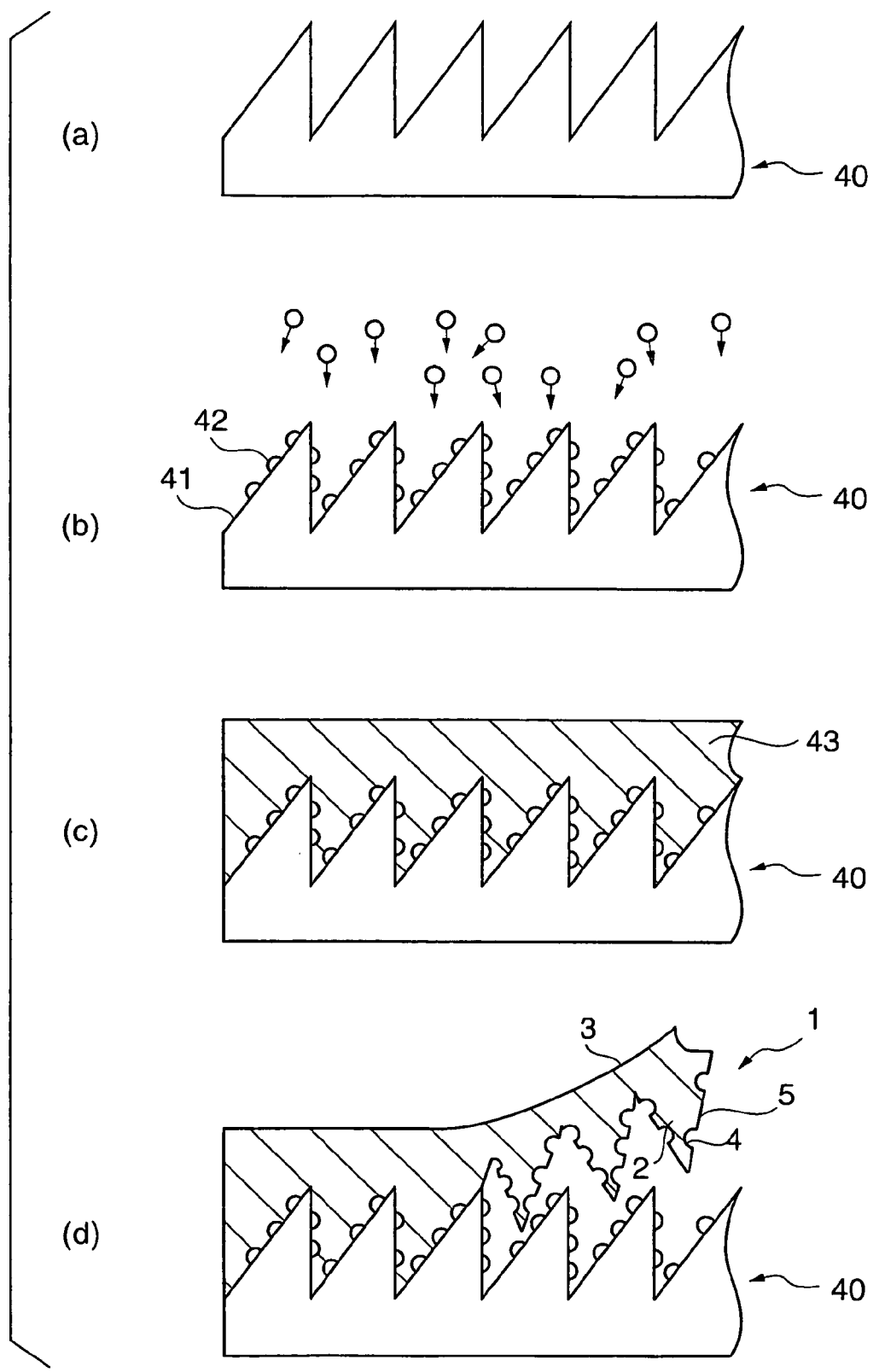
FIG. 3 is a flow chart for explaining a process of producing the optical member according to an embodiment of the present invention.

As shown in FIG. 3(a), a mold 40 that is conventionally used for molding a Fresnel lens sheet serving as the optical member 1 is firstly prepared. Any material can be used for the mold 40.

Next, as shown in FIG. 3(b), in the mold 40 prepared in the step shown in FIG. 3(a), protrusions 42 in a shape that is the reverse of the shape of the concavities which the prisms 2 on the Fresnel lens sheet serving as the optical member 1 has are formed on the part (surface) 41 that corresponds to the part of the resulting optical member 1 has anti-reflection properties (this part is herein the prisms 2 on the Fresnel lens sheet serving as the optical member 1).

Any method can be used for forming the protrusions 42, and, for example, metal particles may be deposited on a predetermined part of the surface 41 of the mold 4 to form thereon the protrusions 42. For such deposition, either a physical or chemical vapor deposition process may be used. Examples of metal particles herein useful include particles of Cu, Au, Ni, and Cr. Instead of such metal particles, silica particles, acrylic particles, $BaSO_4$ particles, or the like may be used. Other methods that can be used for forming the protrusions 42 include a dip coating method.

Thereafter, as shown in FIG. 3(c), a UV (ultraviolet light)-curing resin (molding resin) 43 is cast upon the surface of the mold 40 having the protrusions 42, prepared in the step shown in FIG. 3(b), and UV is applied to the UV-curing resin 43 for curing.

Lastly, as shown in FIG. 3(d), the cured UV-curing resin 43 is released from the mold 40, thereby taking out, as the final optical member 1, a Fresnel lens sheet with prisms 2 having concavities 4 in their surface (the plane of emergence 5).

In the above-described process, a UV-curing resin is used as the molding resin. However, the molding resin is not limited to a UV-curing resin, and any other material may be used as long as it is a material useful for the optical member 1 and can be applied to the production process shown in FIGS. 3(a) to 3(d).

In the above-described embodiment, the process using a mold 40 having, on its surface 41, protrusions 42 in a shape that is the reverse of the shape of concavities 4 which a predetermined part of the optical member 1 has is used for producing the optical member 1. The present invention is not limited to this process, and it is possible to employ any other process as long as it can produce an optical member 1 with concavities 4 having the above-described characteristic features.

Figure 4:
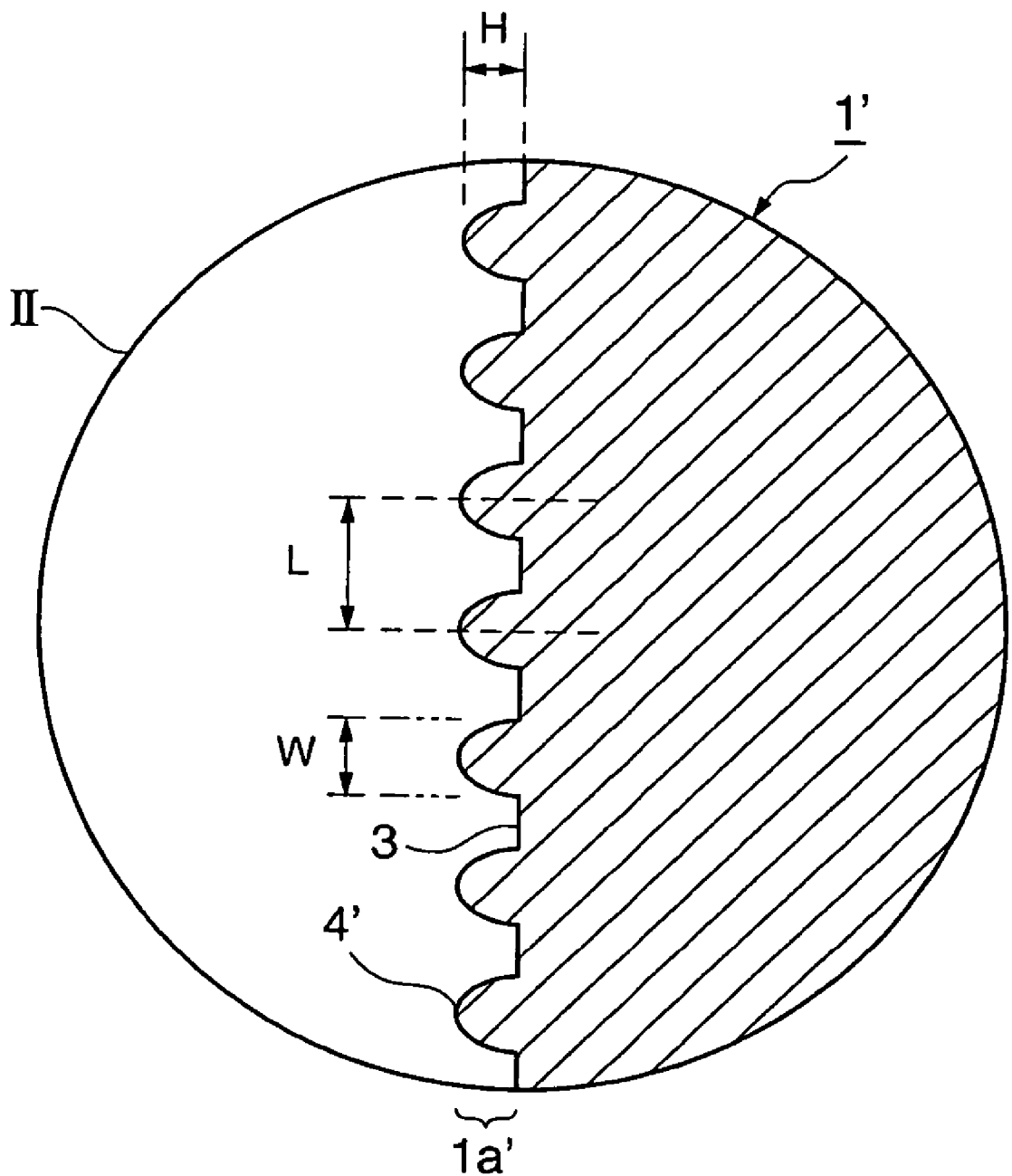
FIG. 4 is a view similar to FIG. 2, showing the optical member shown in FIG. 1 having protrusions on its surface.

Although the above embodiment has been described by referring to the optical member 1 having the concavities 4 in its surface, the present invention is not limited to this embodiment. Actions and effects comparable to those of this embodiment can be obtained even when the optical member 1 has, on its surface, protrusions, as shown in FIG. 4, or protrusions in addition to the concavities 4. As shown in FIG. 4, the plane of incidence 3 has the protrusions 4' having a mean height H, 0.5 to 2 times their radii (W/2) in the direction of plane, the mean distance between neighboring two of the protrusions 4' being denoted by L. Preferably, the protrusions 4' have a mean height H of 0.05 μm or more and 0.5 μm or less, more preferably 0.06 μm or more and 0.5 μm or less, as in the case of the mean depth D of the above-described concavities 4. Further, it is preferable that the mean distance L between neighboring two of the protrusions 4' be not more than 0.5 μm, preferably 0.08 μm or more and 0.2 μm or less, as in the case of the mean distance L between neighboring two of the concavities 4. Furthermore, it is preferable that the ratio of the mean height H of the protrusions 4' to the mean distance L between neighboring two of the protrusions 4' (i.e., H/L) falls in the range of 0.2 to 2, preferably in the range of 0.3 to 1, as in the case of the ratio of the mean depth D of the concavities 4 to the mean distance L between neighboring two of the concavities 4 (i.e., D/L). Preferably, of the optical member 1, the laminar portion 1a' with the protrusions 4' contains the protrusions 4' (base part) in a proportion of 20 to 50%. The optical member 1 having the protrusions on its surface can be obtained in the following manner: by using, as a master mold, the mold 40 shown in FIG. 3(b) (the mold 40 having the protrusions 42 on its surface 41), a mold (a mold having concavities) that is the reverse of the mold 40 is prepared, and the steps shown in FIGS. 3(c) and 3(d) are conducted using this mold prepared.

Figure 5:
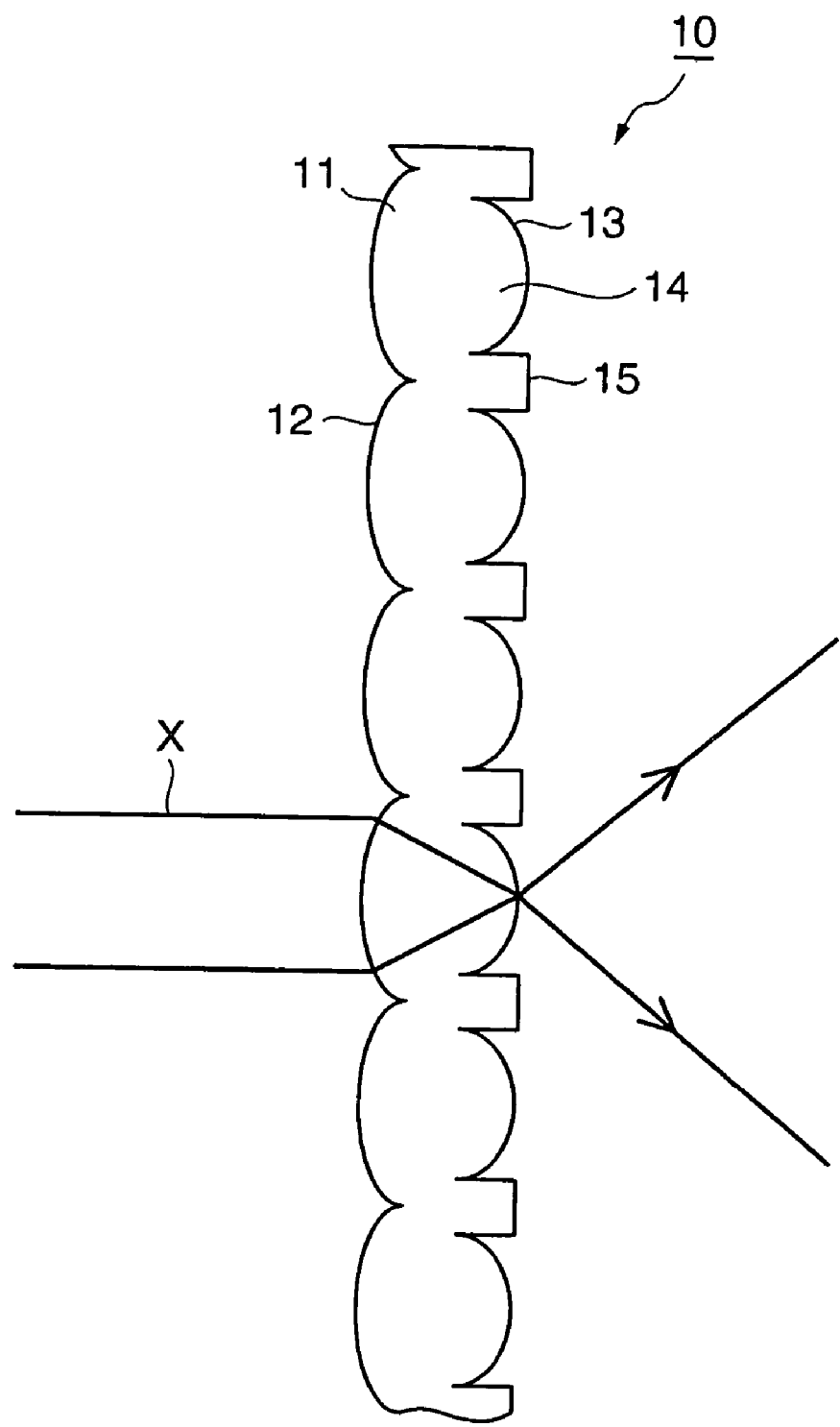
FIG. 5 is a diagrammatic sectional view of a lenticular lens sheet serving as an optical member according to another embodiment of the present invention.

The above embodiment has been described with reference to the Fresnel lens sheet having the prisms 2 that allow incident light to follow optical paths approximately parallel to one another. The present invention is not limited to this Fresnel lens sheet and is also applicable to such an optical member 10 as is shown in FIG. 5 (that is, a lenticular lens sheet) and to other various optical members. The optical member 10 shown in FIG. 5 has, on its plane of incidence 11 and plane of emergence 13, lenses (optical elements) 12, 14 that allow incident light to follow dispersed optical paths, respectively. The plane of emergence 13 has black stripes 15 formed between the lenses 14. Optical members of this type can be used as a variety of lens sheets for use in displays, for example. Specifically, for example, optical members of this type can be used as lens sheets for use in projection screens, as well as cathode ray tube (CRT) displays, liquid crystal displays (LCDs), plasma displays (PDPs), field emission displays (FEDs), and electroluminescence (EL) displays.

In the case of the optical member 10 shown in FIG. 5 (i.e., a lenticular lens sheet), the lenses 12 on the plane of incidence 11, the lenses 14 or the black stripes 15 on the plane of emergence 13, or both the plane of incidence 11 and the plane of emergence 13 may have the concavities 4 in their surfaces.

EXAMPLES

A specific example of the above-described embodiments will be given below.

Example

A Fresnel lens sheet with prisms having a plurality of minute concavities in their surface was prepared by the process shown in FIGS. 3(a) to 3(d), using a mold having minute protrusions on its surface. Ni particles were used as the metal particles to be deposited on the mold, and were controlled to have a mean particle diameter of 0.12 μm. A urethane acrylic resin was used as the UC-curing resin for molding the Fresnel lens sheet.

The mean depth of the concavities in the surface of the Fresnel lens sheet produced was approximately 0.1 μm, and the mean distance between neighboring two of the concavities was 0.2 μm.

Comparative Example 1

A conventional Fresnel lens sheet having no anti-reflection properties was prepared.

Comparative Example 2

A low refractive index layer was formed on the surface of the prisms on a conventional Fresnel lens sheet by a dip coating method. "Cytop" (a fluorine-containing material manufactured by ASAHI GLASS CO., LTD., Japan) was used for the low refractive index layer, and the thickness of the low refractive index layer was made 0.1 μm.

Results of Comparison

Light was applied to the Fresnel lens sheet of Example and to the Fresnel lens sheets of Comparative Examples 1 and 2 from the prism side, and the reflectance of each Fresnel lens sheet was measured at a point in the vicinity of the center of the sheet.

The results were as follows: the reflectance of the Fresnel lens sheet of Example was approximately 0.2%, while the reflectance of the Fresnel lens sheet of Comparative Example 1 was 4.5% and that of the Fresnel lens sheet of Comparative Example 2 was approximately 1%. It was confirmed from these results that the Fresnel lens sheet of Example had excellent anti-reflection properties.

Further, each of the Fresnel lens sheet of Example and the Fresnel lens sheets of Comparative Examples 1 and 2 was combined with a conventional lenticular lens sheet, thereby producing a projection screen. Images were projected on these projection screens under the same conditions. The image projected on the projection screen using the Fresnel lens sheet of Example had high contrast, and no double image was produced on the screen. On the other hand, the images projected on the projection screens using the Fresnel lens sheets of Comparative Examples 1 and 2 had significantly low contrast as compared with the image projected on the projection screen using the Fresnel lens sheet of Example. Moreover, a double image was produced on the lower part of the projection screen using the Fresnel lens sheet of Comparative Example 1.

The invention claimed is:

1. An optical member having planes of incidence and emergence, comprising:
   an optical element that changes an optical path of incident light, the optical element being formed on at least one of the planes of incidence and emergence,
   wherein a predetermined part of the optical member, selected from the planes of incidence and emergence, has a plurality of minute concavities by which reflection of light incident on the predetermined part is prevented, and
   wherein the optical member is formed by casting a molding resin upon a surface, of a mold and by curing the molding resin, the surface of the mold having formed thereon a plurality of minute protrusions of deposited particles in a shape that is a reverse of a shape of the plurality of minute concavities,
   wherein the concavities have a mean depth of 0.05 μm or more and 0.5 μm or less, and a mean distance between neighboring two of the concavities is not more than 0.5 μm,
   the concavities have a mean radius in a direction of plane 0.5 to 2 times the mean depth of the concavities,
   the mean depth of the concavities is 0.2 to 2 times the mean distance between neighboring two of the concavities, and
   wherein, of the optical member, a laminar portion including with the concavities has a percentage of void of 20 to 50%.

2. The optical member according to claim 1, wherein the predetermined part of the optical member, selected from the planes of incidence and emergence, has a plurality of minute protrusions in addition to the plurality of minute concavities.

3. The optical member according to claim 1, wherein the optical member is for use in a projection screen.

4. The optical member according to claim 3, wherein the optical element is one that allows incident light to follow optical paths approximately parallel to one another.

5. The optical member according to claim 3, wherein the optical element is one that allows incident light to follow dispersed optical paths.

6. An optical member having planes of incidence and emergence, comprising:
   an optical element that changes an optical path of incident light, the optical element being formed on at least one of the planes of incidence and emergence,
   wherein a predetermined part of the optical member, selected from the planes of incidence and emergence, has a plurality of minute protrusions by which reflection of light incident on the predetermined part is prevented, the plurality of minute protrusions having a mean height of 0.05 μm or more and 0.5 μm or less, and a mean distance between neighboring two of the protrusions being not more than 0.5 μm.

7. The optical member according to claim 6, wherein the protrusions have a mean radius in a direction of plane 0.5 to 2 times the mean height of the protrusions.

8. The optical member according to claim 6, wherein the mean height of the protrusions is 0.2 to 2 times the mean distance between neighboring two of the protrusions.

9. The optical member according to claim 6, wherein, of the optical member, a laminar portion including the protrusions contains the protrusions in a proportion of 20 to 50%.

10. The optical member according to claim 6, wherein the optical member is for use in a projection screen.

11. The optical member according to claim 10, wherein the optical element is one that allows incident light to follow optical paths approximately parallel to one another.

12. The optical member according to claim 10, wherein the optical element is one that allows incident light to follow dispersed optical paths.

13. A process of producing an optical member, comprising:
   preparing a mold for molding an optical member comprising an optical element that changes an optical path of incident light, a predetermined part of a surface of the mold having a plurality of minute protrusions that correspond to a plurality of minute concavities which a predetermined part of the optical member, selected from planes of incidence and emergence of the optical member, has;
   casting a molding resin upon the surface of the mold having the protrusions to cure the molding resin; and
   releasing the cured molding resin from the mold, thereby taking out the optical member having a plurality of minute concavities in its predetermined part,
   wherein the optical member is formed by casting a molding resin upon a surface, on which a plurality of minute protrusions of particles in a shape that is a reverse of a shape of the plurality of minute concavities are deposited, of a mold and by curing the mold resin,
   wherein the concavities have a mean depth of 0.05 μm or more and 0.5 μm or less, and a mean distance between neighboring two of the concavities is not more than 0.5 μm,
   the concavities have a mean radius in a direction of plane 0.5 to 2 times the mean depth of the concavities,
   the mean depth of the concavities is 0.2 to 2 times the mean distance between neighboring two of the concavities, and
   wherein, of the optical member, a laminar portion including with the concavities has a percentage of void of 20 to 50%.

14. A process of producing an optical member, comprising:
   preparing a mold for molding an optical member comprising an optical element that changes an optical path of incident light, a predetermined part of a surface of the mold having a plurality of minute concavities that correspond to a plurality of minute protrusions which a predetermined part of the optical member, selected from planes of incidence and emergence of the optical member, has;
   casting a molding resin upon the surface of the mold having the concavities to cure the molding resin; and
   releasing the cured molding resin from the mold, thereby taking out the optical member having a plurality of minute protrusions on its predetermined part,
   wherein the optical member is formed by casting a molding resin upon a surface, on which a plurality of minute protrusions of particles in a shape that is a reverse of a shape of the plurality of minute concavities are deposited, of a mold and by curing the mold resin,
   wherein the concavities have a mean depth of 0.05 μm or more and 0.5 μm or less, and a mean distance between neighboring two of the concavities is not more than 0.5 μm,
   the concavities have a mean radius in a direction of plane 0.5 to 2 times the mean depth of the concavities,
   the mean depth of the concavities is 0.2 to 2 times the mean distance between neighboring two of the concavities, and
   wherein, of the optical member, is a laminar portion including with the concavities has a percentage of void of 20 to 50%.

* * * * *